Sept. 4, 1928.
W. THORDARSON
EMULSIFIER
Filed April 13, 1927   3 Sheets-Sheet 2
1,683,500
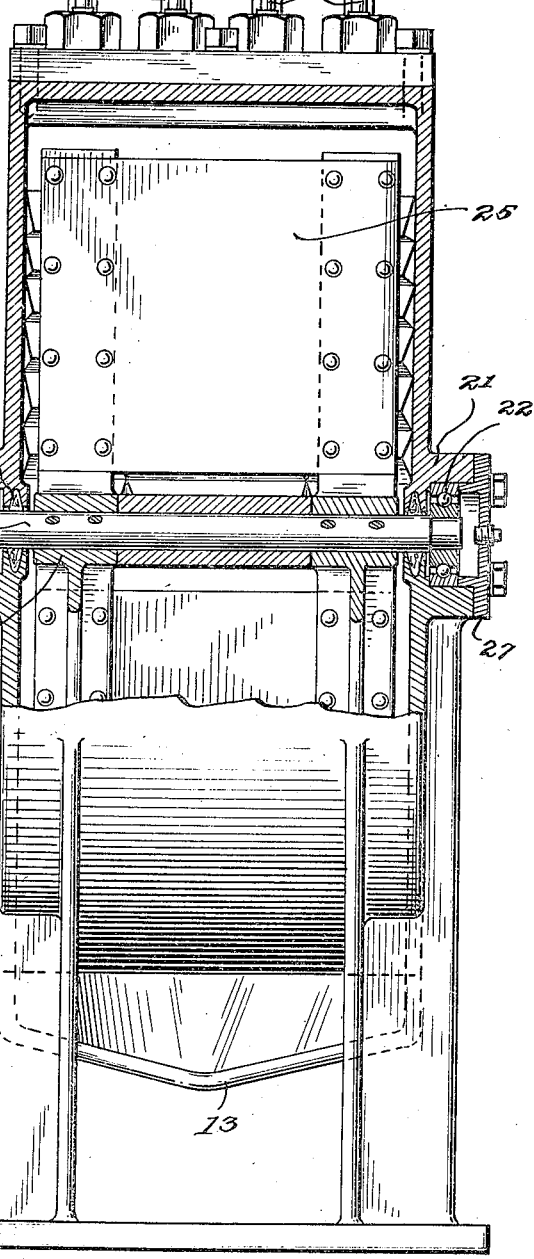
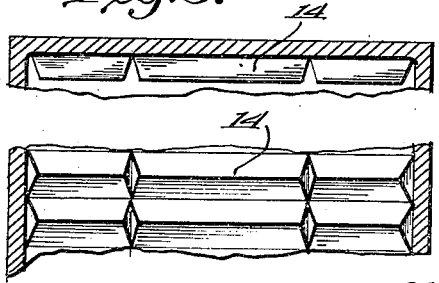
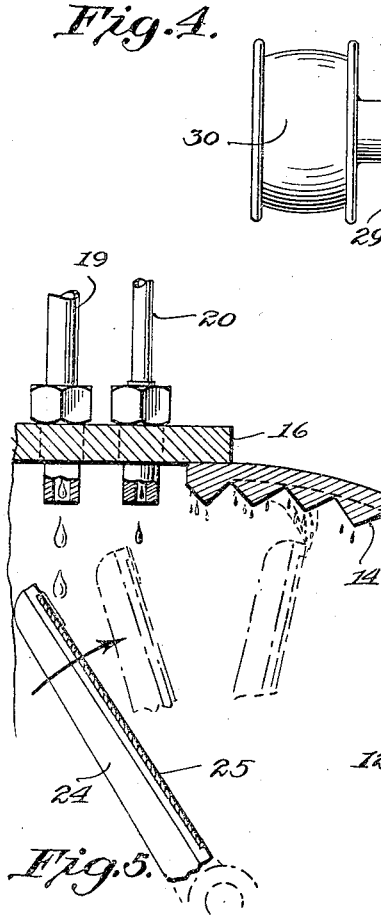
Inventor
William Thordarson
Eugene C. Brown
Attorney Sept. 4, 1928.  W. THORDARSON  1,683,500
EMULSIFIER
Filed April 13, 1927    3 Sheets-Sheet 3

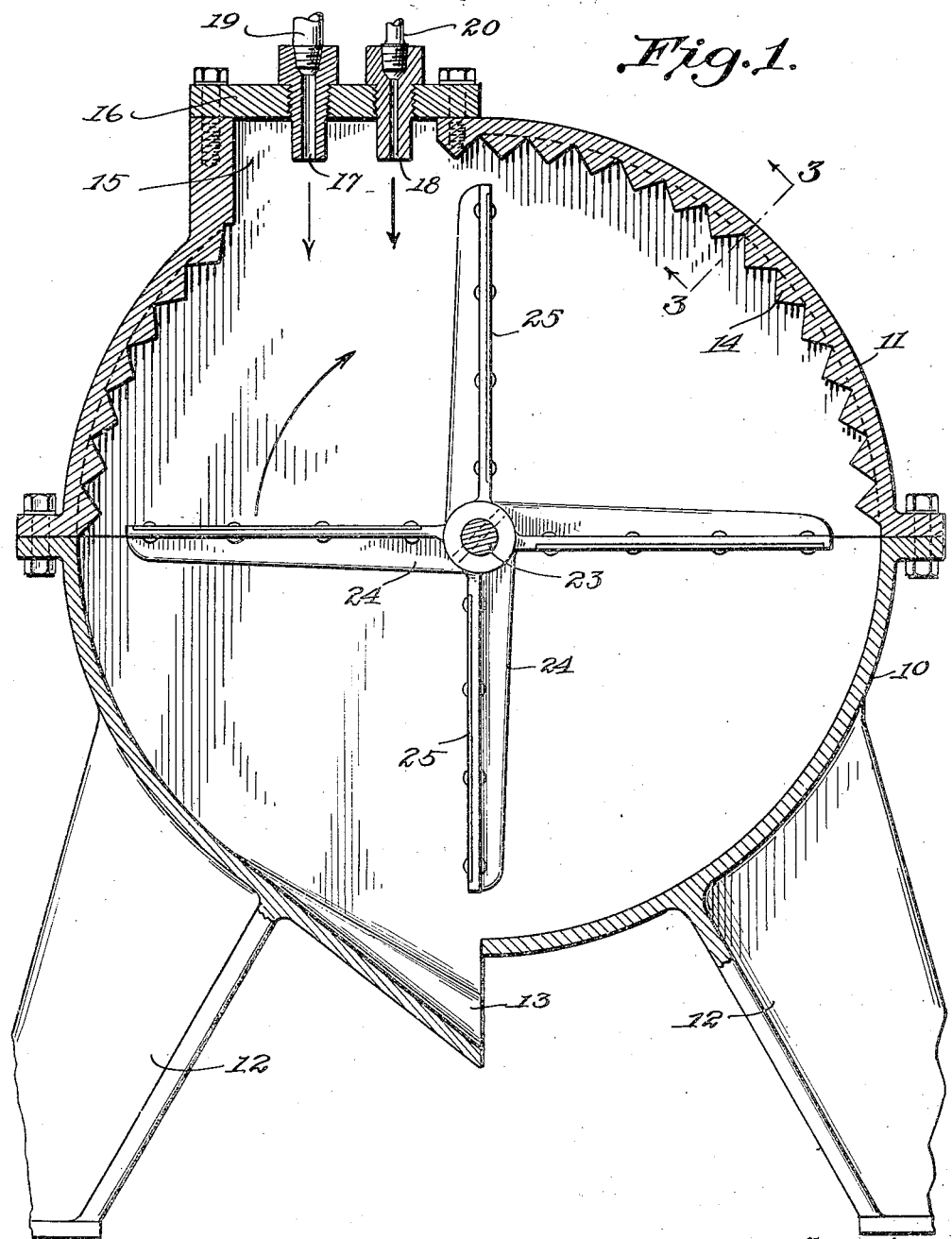

Inventor
William Thordarson

Eugene C. Brown
Attorney

Patented Sept. 4, 1928.

1,683,500

UNITED STATES PATENT OFFICE.

WILLIAM THORDARSON, OF NEW YORK, N. Y.

EMULSIFIER.

Application filed April 13, 1927. Serial No. 183,600.

This invention relates to an apparatus for the treatment of liquids, solutions and the like and has special reference to an emulsifier or homogenizer.

More particularly the invention relates to an emulsifier adapted to produce a very fine emulsification and which can be used to advantage as a colloid mill.

Among the uses to which the apparatus may be put is the washing of petroleum fractions with concentrated sulphuric acid, the manufacture of pigments and other insoluble precipitates and the flocculation and deflocculation of clay solutions to separate the fine clay particles from impurities as well as a number of other uses.

For instance, in ordinary practice petroleum fractions are washed with concentrated sulphuric acid by pumping the acid into the oil and then agitating the mixture by blowing air through it for several hours. This is a time consuming process and the acid is considerably diluted by the water which it abstracts from the air. The present invention accomplishes the same result in a few minutes simply by running in oil through one of the two inlets with which the device is provided and acid through the other and allowing the resultant homogeneous mixture to stand for a few minutes. Besides the saving in time there is no dilution of the acid from atmospheric moisture.

In the manufacture of pigments and other insoluble precipitates two salt solutions may be fed through the nozzle of the machine and due to the intimate homogenization of the two, precipitation takes place instantly and completely. It will be noted that the device constitutes an apparatus for a continuous process of this character which is a great advantage over the batch methods usual in preparing such material. It will also be noted that the two inlets are vital in such an operation because if the two salt solutions come in contact as in the ordinary emulsifying valve or colloid mill the precipitate would almost instantly clog the apparatus.

In using the device for the preparation of emulsions of the wood preserving type, a stream of oil, preferably asphaltic base petroleum, is fed through one of the inlets, while an aqueous solution is fed through the other. The water phase is preferably a solution containing zinc-ion or other water-soluble material of high toxicity toward insects and fungi.

The resutling homogeneous mixture, or emulsion, contains petroleum as the continuous phase, and the aqueous solution as the dispersed phase. Because of the stabilizing effect of the asphaltic materials, emulsions so prepared may be kept for weeks without noticeable separation of the oil and water phases. In wood which has been impregnated with such emulsions, however, the water phase tends to pass into the cells and the cell walls, while most of the oil remains in the intercellular spaces.

Such wood is effectively protected against rot and insect attack by the toxic material introduced into the water phase, and because of its oil content, is thoroughly moisture-proofed.

The principal objects of the invention are to provide an improved emulsifier or homogenizer wherein the substance to be mixed will be held out of contact until introduced into the apparatus; an apparatus wherein the entering substances will be beaten into a fine mist with the two substances thoroughly intermingled; an apparatus wherein after the first beating the substances will be repeatedly beaten so that the resultant production is an extremely fine emulsion or homogeneous dispersion; and other objects as will be hereinafter explained.

Certain embodiments of the invention will now be particularly described and specifically pointed out in the claims, reference being had to the accompanying drawings wherein:

Figure 1 is a vertical section taken transversely through the axis of one form of the invention.

Figure 2 is a side section with the casing partly in section to show the interior construction of the apparatus.

Figure 3 is a section on the line 3—3 of Figure 1.

Figure 4 is an interior face view of that part of the apparatus disclosed in Figure 3.

Figure 5 is a diagrammatic detail showing the action of the apparatus on entering fluids.

Figure 6:
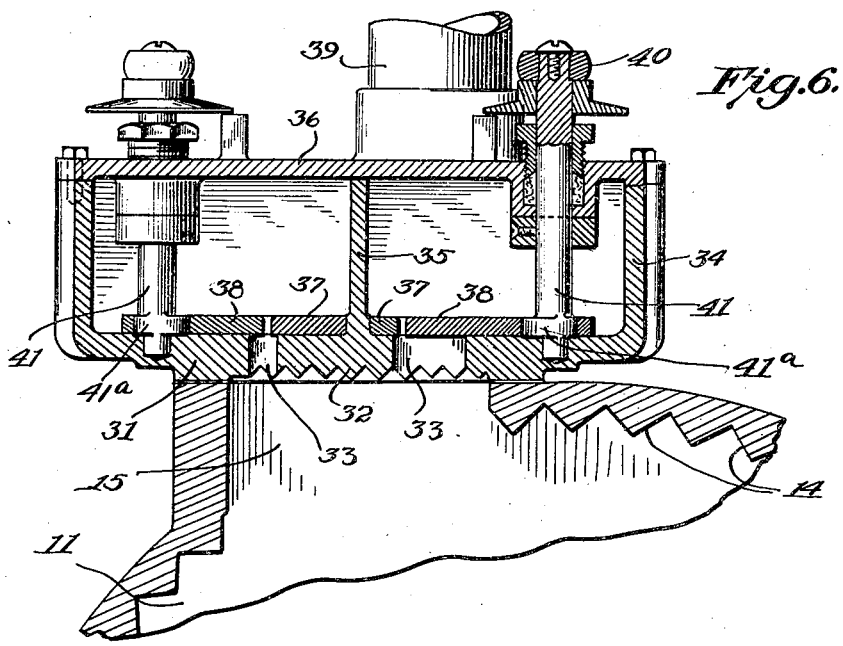
Figure 6 is a detail vertical section showing a modified form of inlet means for the apparatus.

The embodiment of my invention illustrated herein consists of a cylindrical drum having a lower half 10 and an upper half 11, the lower half being supported on legs or standards 12 and having at its lower point an outlet 13. The upper half of the device is provided with a series of ribs 14 triangular in cross section with the apices of the triangles pointing toward the center or axis of the casing, these ribs being disposed on the inner surface of the upper half and being divided into sections as shown in Figures 3 and 4. At one side of the axis the upper half 11 is provided with an upwardly extending inlet chamber 15 closed at its top by means of a cap 16 and, in the form shown in Figures 1 and 2 this cap is smooth on the interior but is provided with a pair of screw threaded openings into which may be screwed the nozzles 17 and 18 which are connected by pipes 19 and 20 with suitable sources of the substances to be commingled. It will be observed by reference to Figure 2 that there are several sets of these nozzles, the number of sets depending on the width of the machine. Each side wall of the machine is provided with a hollow boss 21 receiving a ball bearing 22 wherein is journaled the shaft 23. On this shaft is pinned a pair of spiders 24 carrying blades 25. The shaft projects at one end through a cap or closure 26 secured to the boss while the other end is covered by a somewhat similar cap or closure 27 and the walls, at the points where the shaft passes through, are provided with grooves for the reception of packing 28 to render the casing tight against flow of its contents outwardly or flow of lubricant inwardly from the ball bearings. The cap 26 is likewise provided with packing 29 to prevent loss of lubricant. On the projecting end of the shaft 23 is carried a belt pulley 30 forming driving means for the apparatus.

Figures 7, 8:
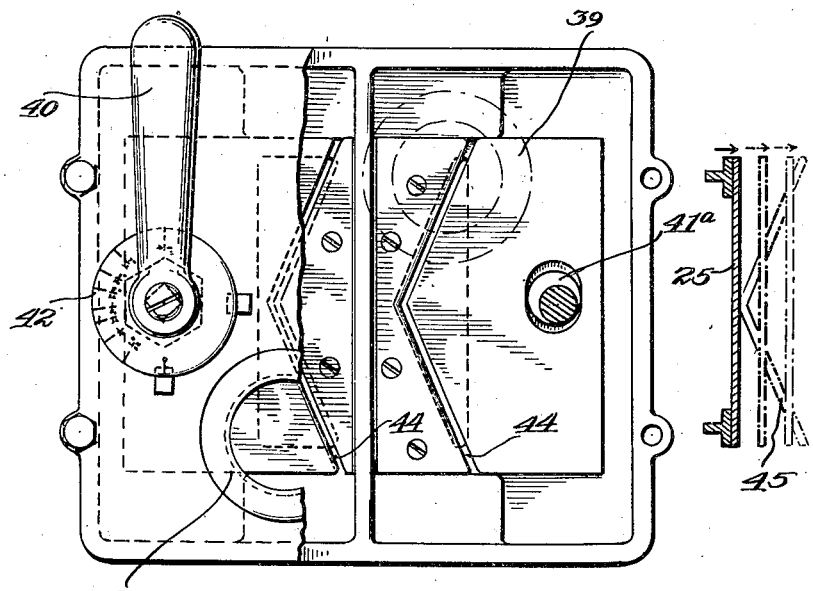
Figure 7 is a plan view of the modification shown in Figure 6 with certain parts of the casing or cover broken away to show the interior construction.
Figure 8 is a diagrammatic view showing the action of the paddles used herein on the entering film when the modification shown in Figures 6 and 7 is used.

In the form of the invention shown in Figures 6 and 7 the cap 16 is replaced by a cap 31 corrugated on its underside as at 32 and provided with a pair of slots 33. The cap 31 has side walls 34 and a central partition 35 thus forming a pair of inlet chambers which are covered at the top by a closure 36. In each one of these chambers there is fixed on the floor a gauge plate 37 cooperating with a movable gauge plate 38 to form a valve for controlling the flow of the substance in the chamber into the cylinder of the machine. These chambers are so arranged as to provide narrow V-shaped slits 44 with the apices of the V's pointing opposite to the direction of rotation of the blades 25. Supply pipes 39 feed the material into the chambers above these valves, which are operated from the exterior by means of handles 40, controlling the valve stems 41 having cams 41ᵃ at their lower ends and provided with setting gauges 42 by means of which the widths of the slits 44 may be accurately adjusted.

In the form in which the nozzles are used, the blades, which are run at a very high rate of speed, strike the substances entering through the nozzles in mid-air and break up the drops into fine particles or into a thin film which is projected by centrifugal action against the corrugated inner surface of the cylinder from the ends of the rapidly rotating blades. As the mixed substances accumulate on the corrugations they flow down to the apices and again drop off to be again struck by the blades and this succession of impacts continues until the mixed material finally reaches the lower part 10 of the cylinder and flows out of the delivery spout or opening 13. In the form shown in Figures 6 and 7 the blades strike first against the points or apices of the descending V-shaped sheets or films of liquid entering the impact chamber 15 through the slits 44. In this manner the blades do not receive the sudden shock which would occur if they struck the whole liquid sheet at once and the impact is thus graduated as the blade progresses through the sheet in the manner illustrated in Figure 8.

The process disclosed herein in which the drops or particles of the liquids are struck while in mid-air by the rapidly moving blades is a radical departure from the prior stirring method of mixing liquids, and the resulting emulsions are superior to those heretofore produced.

The impact of the blade upon the drops of one liquid is followed immediately by the impact with the drops of the other liquid or liquids in such rapid succession that the disrupted particles are superposed and intimately mixed on the blade and are then thrown outwardly upon the corrugated walls of the casing as a heavy spray, falling again in drops to be struck by the blades. The resulting emulsions and homogeneous mixtures are far superior to those heretofore produced. In a single operation they are of sufficient fineness for wood impregnation and many other uses. My apparatus can, of course, be readily adapted for a multi-stage process when desirable.

Having thus described the invention, what is claimed as new, is:

1. In an emulsifier, a cylindrical casing having a portion of its inner wall provided with acutely edged corrugations parallel to its axis and with an outlet at its lower part, a shaft extending axially through said casing and revolvable at high speed, flat paddle blades supported from said shaft to revolve therewith in position substantially radial to the axis of the casing, and a plurality of fluid delivery means arranged to drop a plurality of fluids successively into the path of said revolving blades so that the fluid drops will be struck by the blades while in mid-air.

2. In an emulsifier, a cylindrical casing having a portion of its inner wall provided with acutely edged corrugations parallel to its axis and with an outlet at its lower part, a shaft extending axially through said casing and revolvable at high speed, flat paddle blades supported from said shaft to revolve therewith in position substantially radial to the axis of the casing, and a plurality of fluid delivery means arranged to drop a plurality of fluids successively into the path of said revolving blades, said means being positioned at the corrugated part of the casing and arranged to deliver said fluids close together and one behind the other in respect to said blades whereby one fluid is struck by the blades and driven into the other and against the corrugations.

3. In an emulsifier, a cylindrical casing having a portion of its inner wall provided with corrugations parallel to its axis and with an outlet at its lower part, a shaft extending axially through said casing and revolvable at high speed, flat paddle blades supported from said shaft to revolve therewith in position substantially radial to the axis of the casing, and a plurality of fluid delivery means having V-shaped slits arranged to deliver thin films of fluid V-shaped in cross section into the paths of the blades in position to have the apices of the V-shaped films primarily engaged by said blades.

4. In an emulsifier, a cylindrical casing having a portion of its inner wall provided with corrugations parallel to its axis and with an outlet at its lower part, a shaft extending axially through said casing and revolvable at high speed, flat paddle blades supported from said shaft to revolve therewith in position substantially radial to the axis of the casing, and a plurality of fluid delivery means having V-shaped slits arranged to deliver thin films of fluid V-shaped in cross section into the paths of the blades in position to have the apices of the V-shaped films primarily engaged by said blades, said means including elements arranged to control the thickness of said films.

5. In an emulsifier, a cylindrical casing having its axis horizontal and provided with acutely edged corrugations parallel to its axis on the upper part of its inner wall and with an outlet at its lower part, a shaft extending axially through the cylinder, spaced spiders on said shaft within the casing, flat paddle blades carried by the spiders and extending substantially radial of the cylinder axis, said blades terminating in spaced relation to the corrugated wall of the cylinder, and a plurality of fluid delivery means having V-shaped slits at the upper part of the casing and arranged to deliver a plurality of fluid substances into the casing in position to be struck successively in mid-air by each of said paddle blades.

6. The process of producing fine homogeneous mixtures or emulsions, which consists in producing a rapid series of impacts on successive separate streams of liquid substances, in a direction substantially at right angles to their lines of flow and causing the liquid of one stream to impinge upon the liquid of the preceding stream.

7. The process of producing fine homogeneous mixtures or emulsions, which consists in producing a rapid series of impacts on successive separate streams of liquid substances, in a direction substantially at right angles to their lines of flow causing the liquid of one stream to impinge upon the liquid of the preceding stream, collecting the commingled liquid in drops, subjecting said drops to impacts which disrupt them into a fine mist, and collecting the mist into a liquid mass.

In testimony whereof I affix my signature.

WILLIAM THORDARSON.